(No Model.)
T. A. EDISON.
FILAMENT FOR INCANDESCENT LAMPS.
No. 534,206. Patented Feb. 12, 1895.
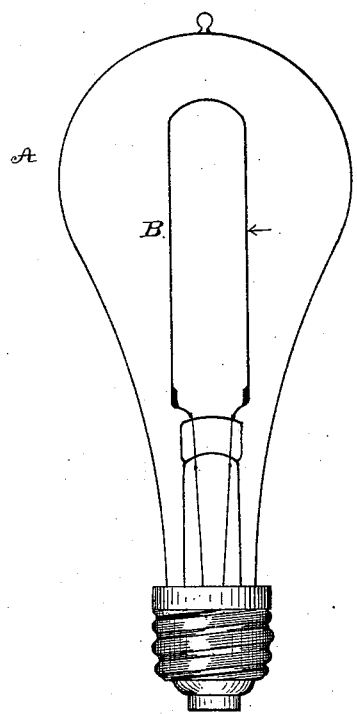
WITNESSES:
INVENTOR:

UNITED STATES PATENT OFFICE.

THOMAS A. EDISON, OF MENLO PARK, NEW JERSEY.

FILAMENT FOR INCANDESCENT LAMPS.

SPECIFICATION forming part of Letters Patent No. 534,206, dated February 12, 1895.

Application filed January 4, 1884. Serial No. 116,474. (No model.)

*To all whom it may concern:*

Be it known that I, THOMAS A. EDISON, of Menlo Park, in the county of Middlesex and State of New Jersey, have invented a new and useful Improvement in Incandescing Conductors for Electric Lamps, (Case No. 610,) of which the following is a specification.

The object of this invention is to produce efficient incandescing conductors for electric lamps; and the invention consists, mainly, in an incandescing conductor formed of carbonized animal material, I prefer to employ certain of the protein substances and especially those horny substances whose essential element is keratin, such as horn, hair, feathers, nails, &c., and of the keratin substances, that which I consider especially desirable is horn. The material, if it is of a horny nature, is softened by boiling it in oil or other liquid having a high boiling point, and is then formed into sheets or into such other form as shall admit of filaments suitable for the incandescing conductors being readily cut, stamped or otherwise formed from it. These filaments are then carbonized. I may however first carbonize the material and afterward form it into filaments.

Instead of horn or other keratin substance I may use the gelatinous proteins such as skin, intestines, sinew, or cartilage of animals, or any other suitable animal protein substance treated in a similar manner to that just described.

When hair is used the filaments are formed directly by carbonizing the separate hairs, or two or more hairs may be massed together.

Quills may be split into filaments and carbonized.

Animal glue, gelatinous or albuminous substances may be formed into sheets, and then into filaments either before or after carbonization.

The carbon filaments formed from any of the substances mentioned are flexible and of high resistance and are therefore well adapted to the use for which they are designed.

The filaments formed from the sheets may be of any desired suitable form preferably having enlarged ends for clamping; or enlarged ends may be formed by a carbon deposit as is well understood.

The accompanying drawing represents an incandescing electric lamp having a conductor embodying my invention.

A is the sealed glass vacuum chamber and B the filament of carbonized animal material inclosed thereby.

What I claim is—

1. An incandescing conductor for an electric lamp consisting of carbonized horn, substantially as set forth.

2. The process of making incandescent conductors for electric lamps, which consists in softening a horny animal substance in a suitable liquid, forming it into filaments, and carbonizing the same, substantially as described.

3. The process of making incandescent conductors for electric lamps, which consists in boiling a horny animal substance in a suitable liquid to soften it, forming the material into a desired shape, and carbonizing it, substantially as described.

This specification signed and witnessed this 15th day of December, 1893.

THOS. A. EDISON.

Witnesses:
H. W. SEELY,
F. McGOWAN.